United States Patent [19]

Shingyoji et al.

[11] Patent Number: 5,657,024
[45] Date of Patent: Aug. 12, 1997

[54] RADAR MODULE AND RADAR SYSTEM

[75] Inventors: Masahito Shingyoji; Masanobu Urabe, both of Wako, Japan

[73] Assignee: Honda Giken Kogyo Kabushiki Kaisha, Tokyo, Japan

[21] Appl. No.: 539,477

[22] Filed: Oct. 5, 1995

[30] Foreign Application Priority Data

Oct. 13, 1994 [JP] Japan .................................. 6-274586

[51] Int. Cl.$^6$ .................................................. G01S 7/28
[52] U.S. Cl. .................................... 342/175; 343/700 MS
[58] Field of Search .............................. 342/175, 70, 71, 342/72; 343/700 MS

[56] References Cited

U.S. PATENT DOCUMENTS

| | | | |
|---|---|---|---|
| 5,181,037 | 1/1993 | Komatsu | 342/70 |
| 5,204,682 | 4/1993 | Beasley | 342/117 |
| 5,229,774 | 7/1993 | Komatsu | 342/70 |
| 5,495,255 | 2/1996 | Komatsu et al. | 342/175 |

FOREIGN PATENT DOCUMENTS

| | | | |
|---|---|---|---|
| 0 531 877 | 3/1993 | European Pat. Off. | G01S 13/34 |
| 0 535 780 | 4/1993 | European Pat. Off. | G01S 13/34 |
| 2 137 449 | 3/1984 | United Kingdom | G01S 13/04 |

OTHER PUBLICATIONS

*International Microwave Symposium Digest* (1992 IEEE MTT-S), Albuquerque, Jun. 1–5, 1992, vol. 2, 1 Jun. 1992, Reid, D.W., pp. 721–724, XP000343421 Williams, D.A.: "Millimetre Wave RADARS for Automotive Applications".

*Primary Examiner*—John B. Sotomayor
*Attorney, Agent, or Firm*—Lyon & Lyon

[57] ABSTRACT

The radar module comprises a vertical layered block of a planar array antenna, a signal delay section, and a transmitter-receiver section. The planar array antenna comprises: four antenna portions different in beam direction; and a selective connection section for selectively connecting each antenna portion with the signal delay section. Reducing the number of parts, saving the production cost and miniaturizing the apparatus is achieved by an arrangement in which a single transmitter-receiver section is in common use with a plurality of antenna portions. The signal delay section comprises a spiral dielectric line with a metal layer covering around a dielectric of rectangular section to achieve ensuring the delay time and reducing the package area.

30 Claims, 6 Drawing Sheets

RADAR MODULE AND RADAR SYSTEM

BACKGROUND OF THE INVENTION

1. Field of the Invention

The present invention relates to a radar system for use on cars and radar modules thereof, and in particular to a small-sized and low production cost radar module and radar system.

2. Description of the Related Art

A radar system loaded on cars, such as passenger car, is utilized in combination with an alarm device or display device for avoiding collision. In such a car-loaded radar system, detectability for a short distance on the order of tens of centimeters is required since a rear-end impact in a short distance between cars during traffic congestion or near collisions during putting a car into a garage is also a target to be warned, and hereby the shape of FM radar signal is more suitable than that of pulse radar. Also in miniaturizing a module, using a millimeter electric wave having a high frequency is preferable. Such a millimeter wave FM radar system is disclosed in the specification of U.S. Pat. Nos. 5,181,037 and 5,229,774 related to the prior application of the present applicant.

Generally, in an FM radar system, the frequency of a beat signal is arranged to rise in proportion to the distance to an object that generated a reflected wave. Accordingly, with shorter distance to the object, the frequency of a beat signal lowers and becomes undetectable under disturbance of 1/f noise which is generated in a mixer. In an FM radar system according to the prior patents mentioned above, to reduce the effect of 1/f noise by raising the frequency of a beat signal, a heterodyne method for modifying the frequency of a local signal is employed or a delay line is inserted. However, a heterodyne method requires a local oscillator used for frequency conversion and accordingly becomes expensive, whereas a method for inserting a delay circuit has a size problem in that an inserted delay line requires a module to be larger in size.

Furthermore, an FM radar system according to the prior patents mentioned above is arranged to switch a transmitter step multiplier, a circulator, antennas used in common for transmission and receiving, a mixer and a receiver step multiplier constituting each FM radar module by a synchronous operation between a transmitter side switch and a receiver side switch. Thus, as many transmitter-receiver sections as antennas become necessary and the number of parts increase, so that there arise problems that the whole FM module does not only become large in size but production cost also increases considerably.

SUMMARY OF THE INVENTION

It is the object of the present invention to provide a small-sized and low-production-cost radar module comprising a few parts and a radar system using this radar module by implementing an arrangement in which a transmitter-receiver section is used in common with a plurality of antennas.

In a radar module according to the present invention, a planar array antenna used in common for transmission and receiving and a transmitter-receiver section for supplying a radiative signal to this array antenna and receiving the reflected signal are layered via an intermediate layer on which a delay section made of a delay line is formed. According to a preferred embodiment of the present invention, said planar array antenna comprises a plurality of antenna portions used in common for transmission and receiving and a selective connection section for selectively connecting each of these antenna portions via said delay line to said transmitter-receiver section.

A delay line implemented with a microstrip line or the like is provided for improving a detection function at near distance by seemingly moving an obstacle to be detected to the front of a car and raising the frequency of a beat signal. This delay line needs to be typically as long as tens of centimeters. By employing a fold back structure, such as a meander line, and a spiral structure, shortening the length of a delay line is performed but is limited in itself. According to the present invention, the size is greatly reduced by placing a delay line between a planar array antenna and a transmitter-receiver section in built layers rather than by placing a delay line in the same plane as with a planar array antenna and a transmitter-receiver section. According to a preferred embodiment of the present invention, a low-loss resin wave guide newly developed is employed as a delay line.

According to a more preferred embodiment of the present invention, a plurality of antenna portions used in common for transmission and receiving are selectively connected to a transmitter-receiver section under control of a selective connection section. Accordingly, one series of transmitter-receiver section including an amplifier, circulator and mixer, is enough for this and thus the number of parts and the space is greatly reduced.

DETAILED DESCRIPTION

Referring to the accompanying drawings, the embodiments of the present invention will be described.

Figure 1:
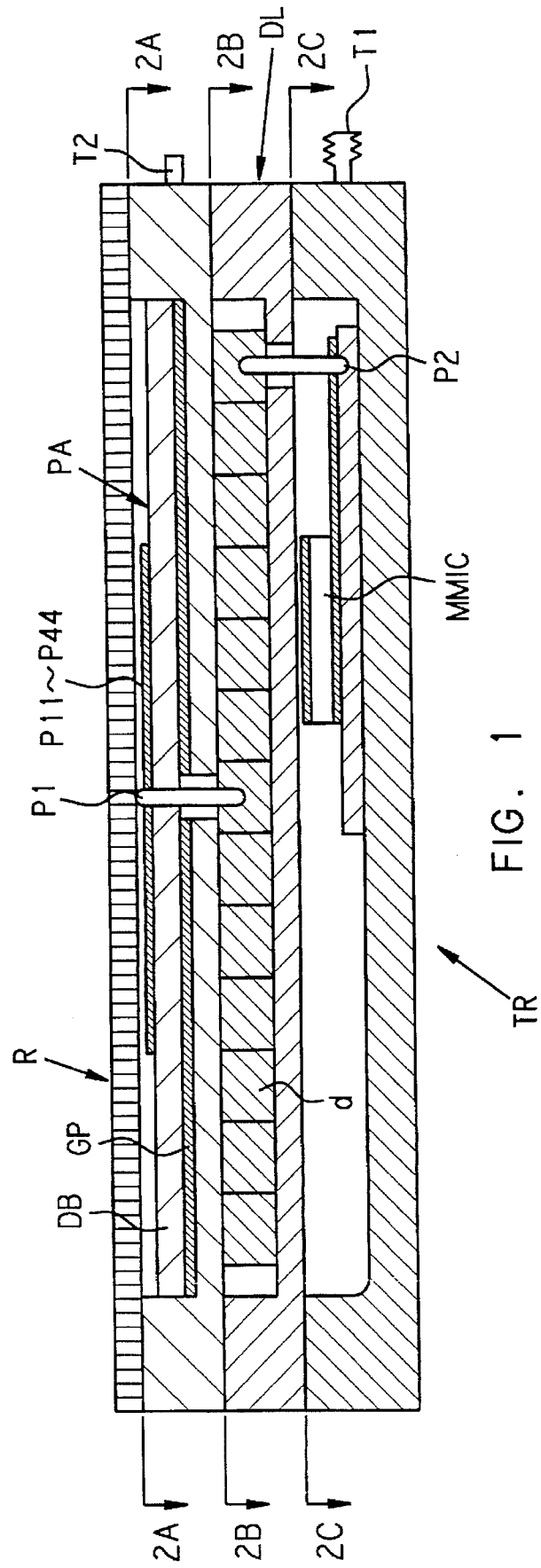
FIG. 1 is a sectional view showing the configuration of an FM radar module according to one embodiment of the present invention.

FIG. 1 is a sectional view showing the configuration of an FM radar module according to one embodiment of the present invention. This FM radar module is so constructed that a planar array antenna PA commonly used for transmission and receiving and a transmitter-receiver section TR for supplying an FM signal to be radiated to this planar array antenna and receiving the received signal are vertically layered via a signal delay section DL in the intermediate layer on which a delay line d is formed. An input signal to or output signal from the monolithic microwave integrated circuit (MMIC) is input or output through a terminal T1. An input signal for scanning a beam is input to a terminal T2, by which the planar array antenna PA is controlled. The planar array antenna PA has a plurality of patches P11 to P44 provided on the surface of a dielectric board DB. On the rear face of the dielectric board DB, a grounding metal layer GP is formed. The planar array antenna PA is covered and protected with a radome R from the external environment.

Figure 2A:
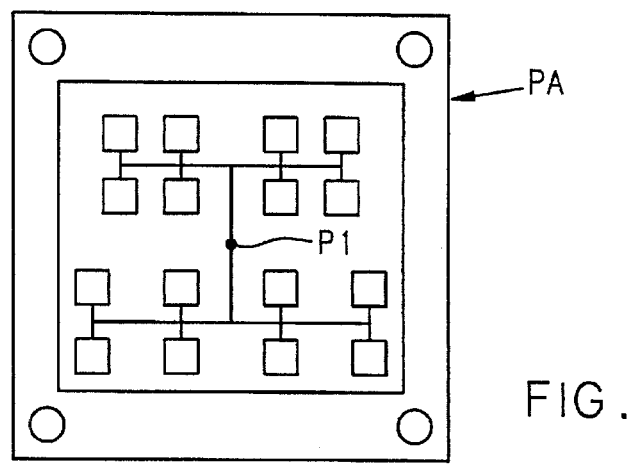
FIG. 2 is a plan view showing the constitution of each layer (A: planar array antenna PA taken along a line 2A—2A of FIG. 1; B: delay section DL taken along a line 2B—2B of FIG. 1; and C: transmitter-receiver section TR taken along a line 2C—2C of FIG. 1) of the FM radar module shown in FIG. 1.
Figure 2B:
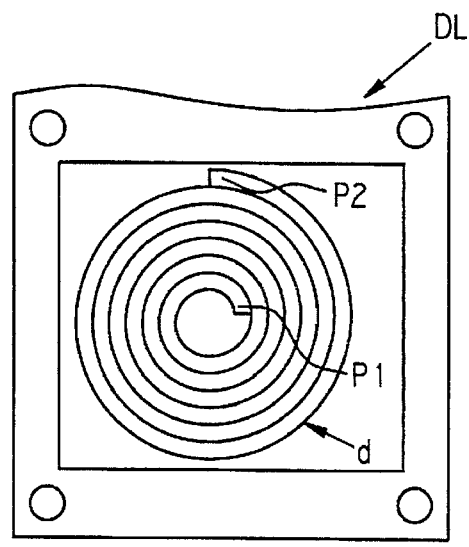
Figure 2C:
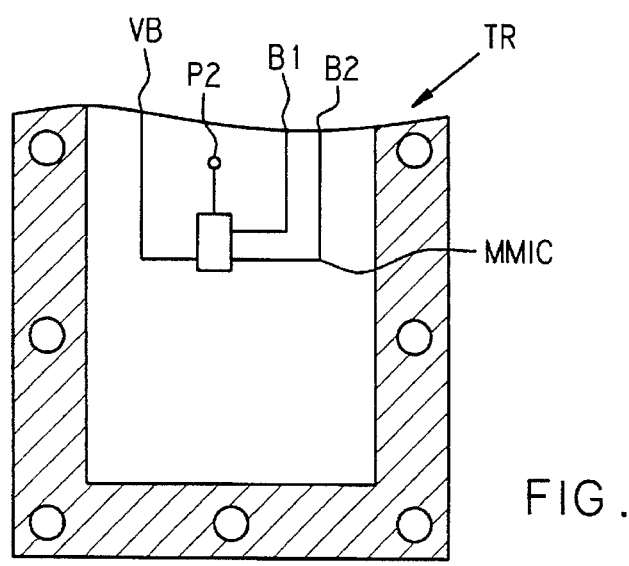

A planar array antenna PA, the top layer of a layered block, a delay section DL, the intermediate layer, and a transmitter-receiver section TR, the bottom layer are so constructed as shown in the respective plan views of FIGS. 2 (A), (B), and (C). Between the planar array antenna PA of the top layer and one terminal of a delay line d forming the signal delay section DL of the intermediate layer a high frequency connection is provided via a pin P1. Between the other terminal of the delay line d and the transmitter-receiver section TR, the bottom layer, a high frequency connection is achieved via a pin P2.

Figure 3:
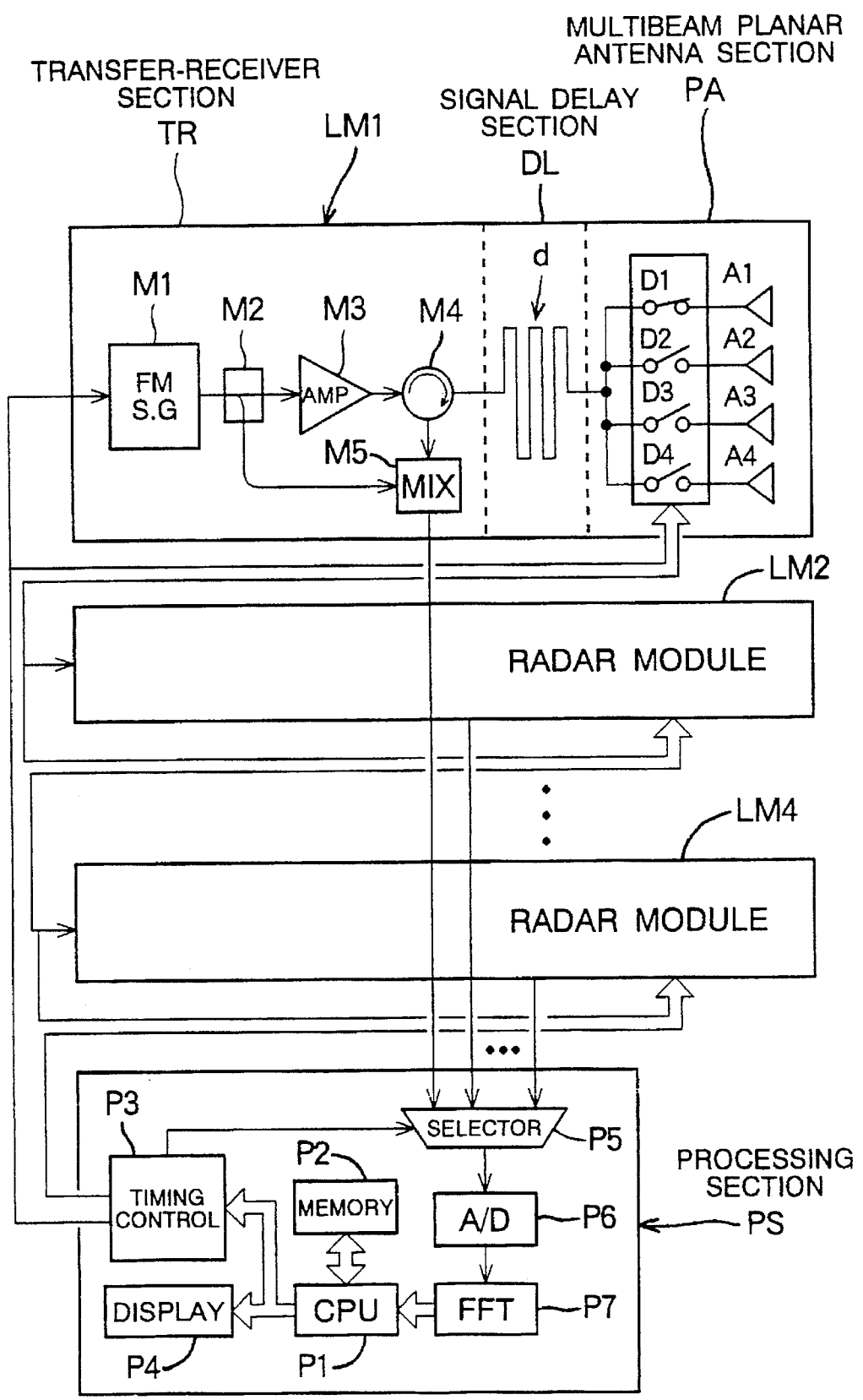
FIG. 3 is a block diagram showing one example of a typical FM radar system including the FM radar module shown in FIGS. 1 and 2.

The FM radar module according to the present embodiment shown in FIGS. 1 and 2 corresponds, for example to one of four FM radar modules LM1 to LM4 constituting the car-loaded FM radar system shown in the block diagram of FIG. 3. The car-loaded FM radar system shown in FIG. 3 comprises four FM radar modules LM1 to LM4 and a process block PS for controlling an action of each FM radar module, processing a signal including information relative to an obstacle, and issuing an alarm. As represented by FM radar module LM1, each of FM radar modules LM1 to LM4 comprises a transmitter-receiver section TR in the bottom layer including an FM signal generator M1, a signal delay section DL, in the intermediate layer, including a delay line d, and a multibeam planar antenna section PA, in the top layer, including four antenna portions A1 to A4.

Figure 4:
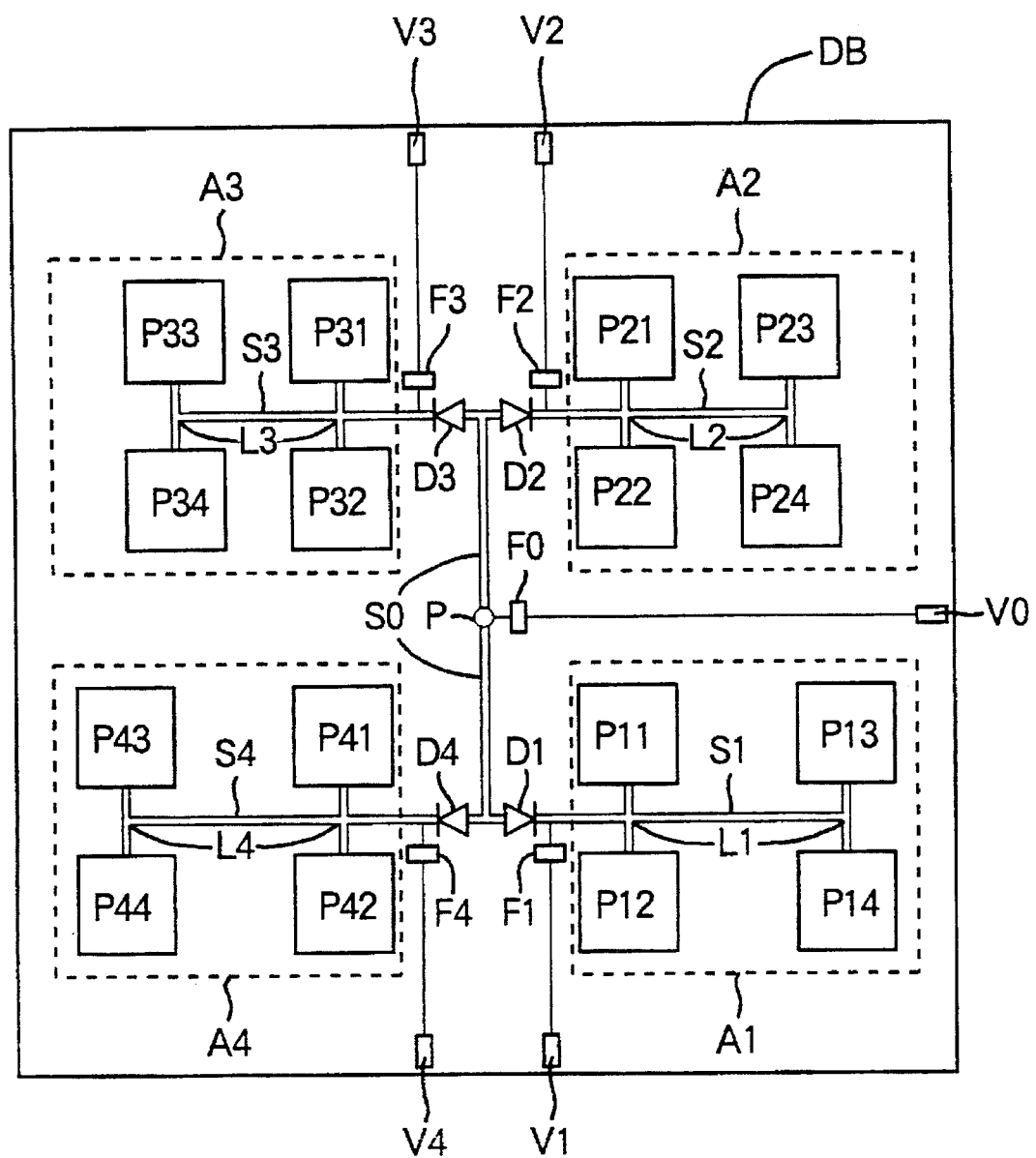
FIG. 4 is a plan view showing the planar array antenna PA in the top layer shown in FIGS. 1 and 2 (A)

As shown in the enlarged plan view of FIG. 4, a planar array antenna PA in the top layer, includes 16 patches of rectangular shape P11–P14, P21–24, P31–34, and P41–P44 arranged on the dielectric board DB on the rear face of which a grounding metal layer GP is formed. At the center of the dielectric board DB, a power section P corresponding to the tip part of the pin P1 is formed. Supply lines S0, and S1 to S4 of microstrip type for connecting this power section P and each patch is formed on the dielectric board DB. 16 patches P11–14, p21–24, p31–34, and P41–44 form four antenna portions A1, A2, A3, and A4 for radiating beams of different tilt angles set in according with a difference in the length of supply lines to them.

The right lower antenna portion A1 comprises left two patches P11, P12 of the same supply line length measured from the power section P and right two patches P13, P14 of a supply line length longer by L1 than these, whereas the right upper antenna portion A2 comprises left two patches P21, P22 of the same supply line length measured from the power section P and right two patches P23, P24 of a supply line length longer by L2 than these.

Similarly, the left upper antenna portion A3 comprises right two patches P31, P32 of the same supply line length measured from the power section P and left upper two patches P33, P34 of a supply line length longer by L3 than these, whereas the left lower antenna portion A4 comprises right two patches P41, P42 of the same supply line length measured from the power section P and left two patches P43, P44 of a supply line length longer by L4 than these. The supply line lengths L1–L4 shift the phase of supply signal between the left patches (P11, P12 etc.) and right patches (P13, P14 etc.) and tilt up transmit-receive beam in accordance with the phase difference.

Power supply from the power section P to the antenna portion A1 is provided through supply lines S0 and S1 of microstrip type, while power supply from the power section P to the antenna portion A2 is provided through supply lines S0 and S2. Power supply from the power section P to the antenna portion A3 and to the antenna section A4 is provided through supply lines S0 and S3 and through supply lines S0 and S4, respectively.

Between the supply line S0 and the individual supply lines S1 to S4, respective PIN diodes D1, D2, D3 and D4 excellent in high frequency characteristics are provided. A bias circuit for each PIN diode is formed including bias input terminals V0 and V1 to V4, and low-pass filters F0 and F1 to F4 on the dielectric board DB. That is, a positive voltage is always kept to be applied to a common bias input terminal V0, while either a higher positive voltage than that applied to the terminal V0 or the ground (zero) voltage is selectively applied to each of the bias input terminals V1 to V4. This selective voltage is supplied from a timing control circuit P3 in the processing section PS of FIG. 3 through a terminal T2 of FIG. 1. When the ground voltage is applied to any of bias input terminals V1 to V4, the corresponding one of PIN diode D1 to D4 becomes conductive so that the supply line S0 and the corresponding one of supply lines S1 to S4 is electrically connected and thus a high frequency power is supplied from the power section P to the corresponding one of antenna portions A1 to A4.

Figure 5:
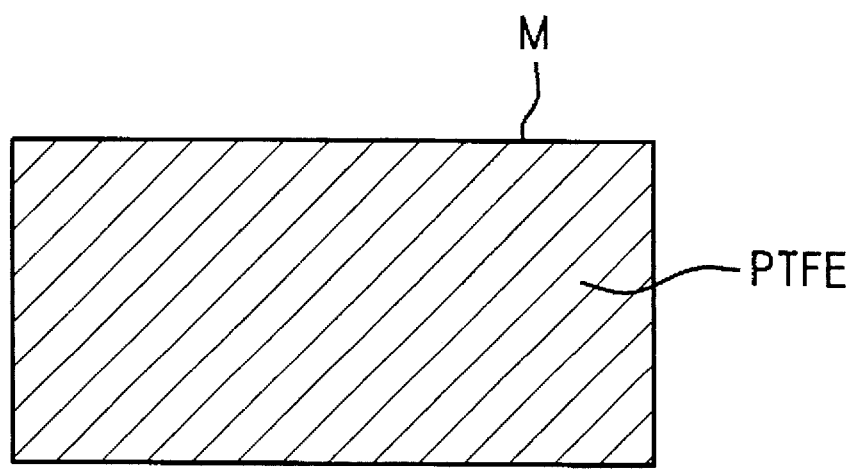
FIG. 5 is a sectional view showing one example of a resin wave guide d comprising the delay section DL in the intermediate layer shown in FIGS. 1 and 2 (B)

A delay line d comprising a signal delay section DL in the intermediate layer comprises a resin wave guide of spiral shape. This resin wave guide was newly made by the inventors for an FM radar module according to the present embodiment on an experimental basis and has a cross-sectional shape shown in FIG. 5. The resin wave guide is made of polytetrafluoroethylene (PTFE), has a rectangular cross-section, and comprises a metal foil M deposited on the surface of a rod-shaped dielectric line PTFE by plating. The aspect ratio of the cross-section of the dielectric line is approx. 1:2, and when the frequency of an FM signal to be delayed is 60 GHz, the transverse width is 3.8 mm, smaller than that of a wave guide (5.8 mm). Because of being smaller in size than a normal wave guide and elastic, this resin wave guide has advantages in that a delay line of still smaller size can be implemented with a high density winding.

The passing loss in this resin wave guide is approx. 3 dB/m in a state of straight line when the frequency of a signal is 60 GHz. However, bending at a small radius of curvature increases the passing loss to on the order of 4 dB/m. This value of passing loss is greater than a value of a wave guide without dielectric loss (approx. 1.2 dB/m), but rather smaller than a value of a microstrip line (approx. 7 dB/m). The feature of a resin wave guide, formed by depositing a metal foil on the surface of a rod-like body made of polytetrafluoroethylene (PTFE) or the like, is its elasticity and accordingly its delay time can be made longer by implementing a longer dielectric line in a dense spiral shape as shown in FIGS. 1 and 2(B). Incidentally, since the passing loss increases with smaller radius of curvature, employing a helical structure in which all parts are one and the same radius of curvature enables a constitution of reduced passing loss in place of a spiral structure in which the radius of curvature decreases for the inner part.

As represented by the transmitter-receiver section LM1 in FIG. 3, the transmitter-receiver section TR in the bottom layer comprises an FM signal generation circuit M1, a directional coupler M2, an amplifier M3, a circulator M4, and a mixer M6. As shown in FIG. 2 (C), this transmitter-receiver section TR is made into a monolithic microwave integrated circuit (MMIC) and housed in a package. An FM signal is provided to the package through an input/output pin P2. A timing signal or connection control instruction is input from the processing section PS in FIG. 3 through signal lines B1, B2, and DC operational power is supplied through a power supply line VB. Where the circulator M4 is relatively difficult to be made into MMIC, a hybrid microintegration construction may be employed in which the circulator M4 will be added externally of a separate member which in turn is made into MMIC, abandoning making the circulator itself into MMIC.

Figure 6:
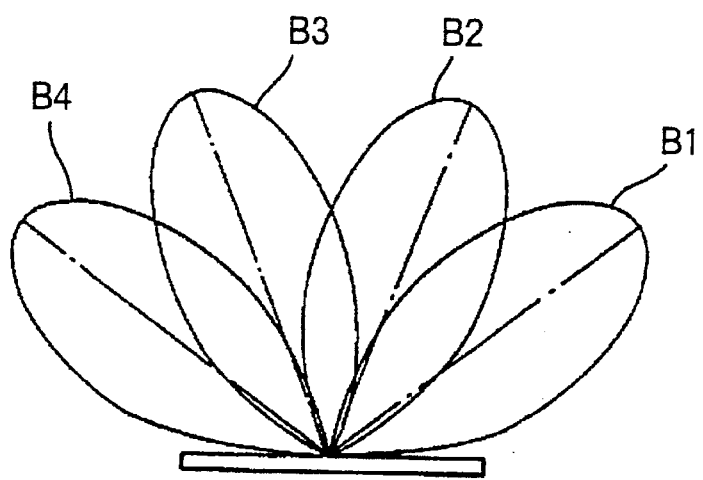
FIG. 6 is a drawing showing one example of beam patterns B1 to B4 of electric waves radiated from each of the antenna portions A1 to A4 shown in FIG. 3.
Figure 7:
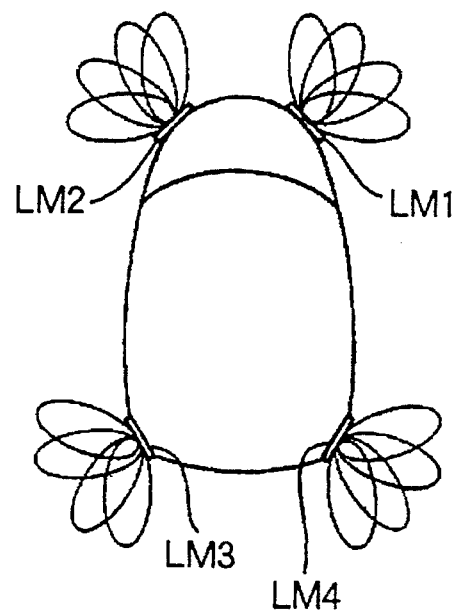
FIG. 7 is a drawing showing the disposition and one example of beam pattern of four radar modules LM1 to LM4 included in the car-loaded FM radar system shown in FIG. 3.

Because of having mutually different tilt angles, the antenna sections A1 to A4 of each FM radar module radiate four beams B1 to B4 in different directions as shown in FIG. 6. Thus, if one of four beams B1, B2, B3 and B4 is radiated in sequence for a predetermined period (2–6 msec) from one of four antenna portions A1, A2, A3 and A4 by making one of four PIN diodes D1, D2, D3 and D4 conductive in the same sequence for a predetermined period (2–6 msec) and each reflected wave generated at an object is propagated along a reverse route to the power section P, then beam scanning is carried out in four different direction with these planar array antennas. Each of radar modules LM1 to LM4 is installed on four corners of a car as shown in the drawing of FIG. 7, and the processing section PS is installed at an appropriate place in the car.

Referring to FIG. 3, an FM signal generator M1 in the FM radar modules LM1 to LM4 generates an FM signal whose frequency changes for a predetermined period in a sawtooth form in response to timing control signals received from the timing control circuit P3 of the processing section PS. Part of the generated FM signal is supplied through the directional coupler M2, amplifier M3, and circulator M4 to the multibeam planar array antenna PA, propagates through one of PIN diodes D1 to D4 to be turned ON/OFF (2–6 msec) in response to a control signal received from the timing control circuit P3 in the processing section PS, and radiated from the corresponding one of antenna portions A1 to A4 to the outside of a car. An FM signal radiated from an antenna portion and reflected from an object outside of the car is received by the corresponding antenna portion and supplied through the delay line d constructed using the resin wave guide and through the circulator M4 to one input terminal of the mixer M5.

To the other terminal of the mixer 5, part of the FM signal generated in the FM signal generator M1 is supplied through the coupler M2. Thus, the mixer M5 outputs a beat signal whose frequency increases in accordance with the distance to the object generating the reflected wave. The respective beat signal outputted from each of FM radar modules LM1 to LM4 is supplied to the selector P5 in the processing section PS. Referring to a radar module specifying signal supplied from the timing control circuit P3, a beat signal to be supplied to the A/D conversion circuit P6 is selectively switched in a time sharing method by the selector P5. A beat signal selected by the selector P5 is converted by the A/D convertor P6 into a digital signal. The beat signal converted into a digital signal is divided into frequency spectra in a fast Fourier transformation circuit (FFT) P7. The signal processing circuit P1 comprises a CPU which does not only detect the information relative to an obstacle by referring to the frequency spectra of the beat signal and computes the position of the obstacle and the relative velocity speed of approach but also judges the possibility of collision with the obstacle and displays information relative to the existence of the obstacle, the distance to the obstacle, the possibility of collision and the like on a display P4. Incidentally, the signal processing circuit P1 can also generate a signal for controlling the accelerator and brake of the car.

Heretofore, the tilt angles were set right-to-left. However, setting the tilt angles front-to-back or setting the tilt angles right-to-left and front-to-back in combination is also possible according to the present invention.

Although each antenna portion is described as comprising four patches, according to the need, for example for sharpening the directional characteristic, each antenna portion can comprise a larger appropriate number of patches than four.

Furthermore, an application of beam to scanning by radiating an electric wave from only one of a plurality of antenna portions is described. However, the present invention is applicable to changing the synthetic directional characteristic by radiating electric waves from any two of these.

Also, a structure of implementing a delay line for an FM signal by using a resin wave guide of small passing loss is disclosed. However, when an increase in passing loss is allowable, using a delay line of microstrip type or triplet type is also possible in place of a dielectric line.

Also, there is described herein an FM radar module for radiating an FM signal as an example, but the present invention is applicable also to a pulse radar module for radiating a pulse signal.

As described in detail, a radar module according to the present invention presents a stereographic structure in which a planar array antenna commonly used for transmission and receiving and a transmitter-receiver section are layered via the intermediate layer in which a delay line is formed and thus has advantages in that the function of close distance detection can be implemented in a small-sized structure.

Also, according to a preferred embodiment of the present invention, a planar array antenna of the type commonly used for transmission and receiving comprises a plurality of antenna portions that can be selectively connected through the above delay line to the transmitter-receiver section. Thus, a single transmitter-receiver section is used in common with a plurality of antenna portions, so that the production cost is greatly reduced with a great decrease in the number of parts and miniaturization can also be implemented.

What is claimed is:

1. A radar module comprising:

a planar array antenna formed on a substrate having a rear face; and a transmitter-receiver section for supplying a signal to be radiated to said planar array antenna and receiving the received signal from this planar array antenna; wherein a delay line is inserted in between said planar array antenna and said transmitter-receiver section; and said delay line is disposed adjacent the rear face of said planar array antenna.

2. The radar module as set forth in claim 1, wherein said planar array antenna comprises:

a plurality of antenna portions used in common for transmission and receiving; and a selective connection section for selectively connecting each of these antenna portions through said delay line to said transmitter-receiver section.

3. The radar module as set forth in claim 2, wherein
said plurality of antenna portions have respective tilt angles set in different directions with respect to each other.

4. The radar module as set forth in any of claims 1 to 3, wherein
said transmitter-receiver section comprises an FM signal generation circuit for generating FM signals radiated from said planar array antenna; and
including a mixer for mixing a receive signal of said planar array antenna with part of an FM signal generated in said FM signal generation circuit to generate a beat signal.

5. The radar module as set forth in any of claims 1 to 3, wherein
said delay line comprises a wave guide in which a metal layer covers around a dielectric of rectangular cross-section.

6. The radar module as set forth in claims 5, wherein
said wave guide is formed in a spiral.

7. A radar module comprising:
a planar array antenna for transmitting or receiving a high-frequency signal; and
a transmitter-receiver circuit for supplying a high-frequency signal to or receiving a high-frequency signal from said planar array antenna; wherein
a delay line formed of a rod-shaped dielectric of rectangular section covered over four peripheral sides with metal is inserted in between said planar array antenna and said transmitter-receiver circuit.

8. A radar module for transmitting and receiving a high-frequency signal to detect an object, comprising:
a scan type planar antenna disposed on a dielectric substrate for scanning a high-frequency signal;
a monolithic micro IC (MMIC) including a high-frequency signal generator and receiver for receiving a signal reflected from an object; and
a connection for supplying a high-frequency signal from the rear face of said scan-type planar antenna to the planar antenna with said MMIC disposed near a rear face of the planar antenna.

9. The radar module as set forth in claims 8, wherein
said scan-type planar antenna is arranged in a plane and comprises a plurality of rectangular patches disposed on a dielectric base and switch means for selectively supplying a high-frequency signal to each of the patches.

10. The radar module as set forth in claims 8, wherein
said scan-type planar antenna is a time-sharing scan-type planar antenna.

11. The radar module as set forth in claims 8, further comprising:
a delay line for temporally delaying a transmit or receive signal.

12. A radar system for detecting the position of an object by transmitting a high-frequency signal to said object and receiving a signal reflected from an object, comprising:
a plurality of radar modules composed of monolithic micro IC (MMIC) including a high-frequency signal generator and a mixer diode for generating a beat signal from a signal reflected from an object, and a scan-type planar antenna connected to said MMIC for radiating a high-frequency signal to a space while scanning;
a selector circuit for selecting a plurality of output signals from said plurality of radar modules;
an A/D converter for converting a signal selected in said selector circuit into a digital signal; and
a signal processing circuit for analyzing the frequency of a received signal based on said digital signal and for obtaining information relative to said object.

13. The radar system as set forth in claim 12, wherein
said signal processing circuit comprises a timing control circuit for controlling the scanning of a plurality of radar modules.

14. The radar system as set forth in claim 12, wherein
a plurality of radar modules are placed around a car.

15. The radar system as set forth in claim 12, wherein
a scan-type planar antenna is a scan-type planar array antenna supplied by the MMIC from the rear of the antenna.

16. The radar system as set forth in claim 12, wherein
said scan-type planar antenna performs time-sharing beam scanning.

17. The radar system as set forth in claim 12, wherein
said radar module has a delay line provided between a planar antenna and a transmitter-receiver circuit.

18. The radar system as set forth in claim 17, wherein
said delay line is a dielectric wave guide.

19. The radar system as set forth in claim 17, wherein
said delay line is in a spiral form of said dielectric wave guide.

20. The radar system as set forth in claim 12, wherein
the high-frequency signal to be transmitted to an object is an FM signal.

21. A transceiver comprising:
a planar array antenna formed on a substrate having a rear; and
a transmitter-receiver section for supplying a signal to be radiated to said planar array antenna and receiving the received signal from this planar array antenna; wherein
a delay line inserted in between said planar array antenna and said transmitter-receiver section; and
said delay line is disposed adjacent the rear of said planar array antenna, between the antenna and the transmitter-receiver section.

22. The radar module as set forth in claim 21 wherein said planar array antenna comprises:
a plurality of antenna portions used in common for transmission and reception; and
a selective connection section for selectively connecting each of these antenna portions through said delay line to said transmitter-receiver section.

23. The radar module as set forth in claim 22 wherein
said delay line comprises a wave guide in which a metal layer covers a dielectric of rectangular cross-section, and
said wave guide is formed in a spiral.

24. A transceiver comprising:
a planar array antenna for transmitting or receiving a high-frequency signal; and
a transmitter-receiver circuit for supplying a high-frequency signal to or receiving a high-frequency signal from said planar array antenna; wherein
a delay line formed of a rod-shaped dielectric of rectangular section covered over four peripheral sides with metal is inserted in between said planar array antenna and said transmitter-receiver circuit.

25. A module for transmitting and receiving a high-frequency signal to detect an object, comprising:

a scan type planar antenna disposed on a dielectric substrate for scanning a high-frequency signal;

a monolithic micro IC (MMIC) including a high-frequency signal generator and receiver for receiving a signal reflected from an object;

a connection for supplying a high-frequency signal from the rear of said scan-type planar antenna to the planar antenna with said MMIC disposed near a rear face of the planar antenna; and a delay line between the antenna and MMIC for delaying a transmit or receive signal.

26. The module as set forth in claim 25, wherein said scan-type planar antenna is arranged in a plane and comprises a plurality of rectangular patches disposed on a dielectric base, and switch means for selectively supplying a high-frequency signal to each of the patches.

27. A system for detecting the position of an object by transmitting a high-frequency signal to an object and receiving a signal reflected from an object, comprising:

a plurality of radar modules composed of a monolithic micro IC (MMIC) including a high-frequency signal generator and a mixer diode for generating a beat signal from a signal reflected from an object, and a scan-type planar antenna connected to said MMIC for radiating a high-frequency signal to a space while scanning;

a delay line between the antenna and the MMIC adjacent a rear of the antenna;

a selector circuit for selecting a plurality of output signals from said plurality of radar modules; and a signal processing circuit for analyzing the frequency of a received signal based on said output signals and for providing information relative to an object.

28. The radar system as set forth in claim 27 wherein said signal processing circuit comprises a timing control circuit for controlling the scanning of a plurality of radar modules.

29. The radar system as set forth in claim 27 wherein a plurality of radar modules are placed around a car.

30. The radar system as set forth in claim 27, wherein said delay line is in a spiral form of dielectric wave guide.

* * * * *